Oct. 11, 1938.   E. R. STOEKLE   2,132,765
ADJUSTABLE FRICTION TORQUE TRANSMITTING MEANS FOR ELECTRICAL CONTROLS
Filed Nov. 22, 1937
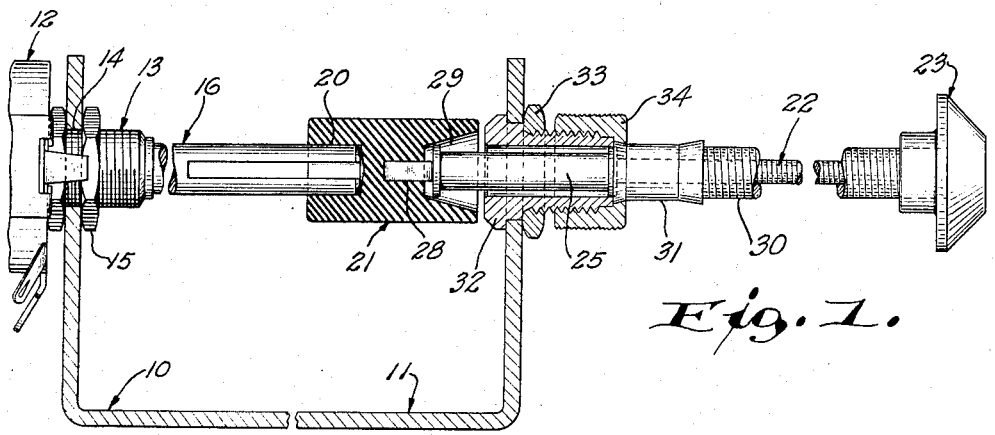
Fig. 1.
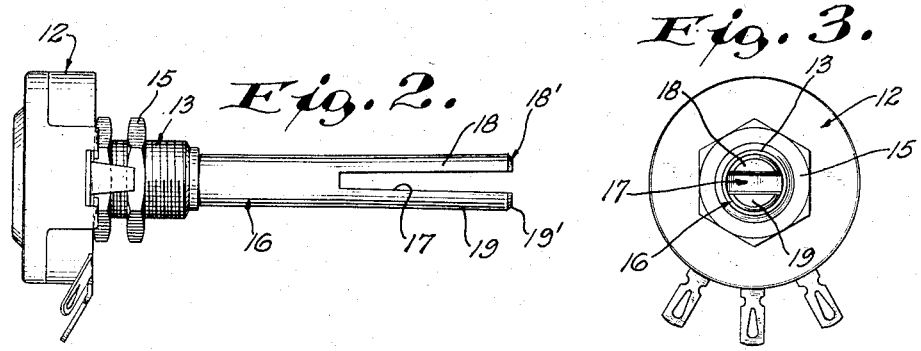
Fig. 2.   Fig. 3.
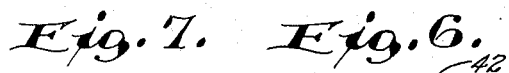
Fig. 7.   Fig. 6.   Fig. 9.
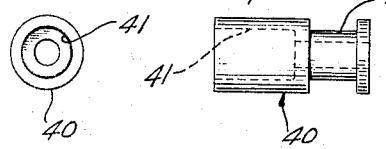
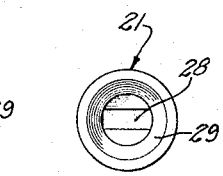
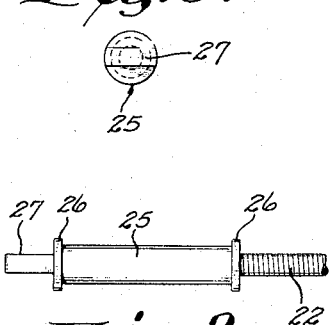
Fig. 4.   Fig. 5.   Fig. 8.
INVENTOR.
ERWIN R. STOEKLE
BY John W. Michael
ATTORNEY.

Patented Oct. 11, 1938

2,132,765

UNITED STATES PATENT OFFICE

2,132,765

ADJUSTABLE FRICTION TORQUE TRANSMITTING MEANS FOR ELECTRICAL CONTROLS

Erwin R. Stoekle, Milwaukee, Wis., assignor to Globe-Union Inc., Milwaukee, Wis., a corporation of Delaware Application November 22, 1937, Serial No. 175,799

8 Claims. (Cl. 64—11)

This invention relates to an improvement in adjustable means for transmitting the required torque from an actuating element such as a knob or handle to a control device, for example, a variable resistance or volume control employed in radio receivers. In radio receivers of the type used in automobiles it is common to connect the operating knob with the movable element of the volume control or the like by means of a flexible shaft and the present device is especially designed and adapted to be incorporated in the connection between the flexible shaft and the movable element or operating shaft of the volume control or a similar control device.

In receivers of this character the operating knob is usually equipped with an indicator which shows the position of the control that is operated or adjusted by the knob and at times it is necessary to shift the operating knob and its indicator relative to the control device in order that the indicator will correctly show the position of the control at the knob. While it is essential to provide for such adjustment it is also necessary that the motion transmission train between the knob and the control device be constituted to transmit sufficient torque from the operating knob to the driven parts of the control to properly actuate the latter. In an attempt to satisfy the requirements of this problem in instances where the volume control is in the form of a variable resistance, it has been proposed to frictionally attach the variable or adjustable contact of the resistance to the driving shaft thereof. This expedient however has a distinct disadvantage in that the small space available within the controls of this character makes it difficult or impractical to provide an effective friction clutch between the adjustable contact and the shaft which is capable of transmitting a uniform frictional torque.

One of the objects of the invention is to provide an adjustable friction torque transmitting means for electrical controls of the character referred to which is adapted to be incorporated in the motion transmission train between the knob and the driven parts of the control at any desired location exteriorly of the control itself and which is so constituted as to be capable of transmitting the required torque from the knob to the control and yet susceptible of the adjustment necessary to cause the knob of the indicator associated therewith to properly display or indicate the position of the control. Such an arrangement has a distinct advantage inasmuch as control devices of the character here contemplated are becoming so small that it is difficult or even impossible to incorporate satisfactory frictional clutches or couplings within the housing thereof and this is especially true in automobile radio receivers where space is very limited. The type of control device with which the present invention is adapted for advantageous use are exemplified in my application for "Variable resistances and method of making the same", Serial No. 144,997.

Another object is to provide between the driving means and the driven shaft of an electrical control a friction coupling of simple design and with an easily adjustable maximum torque at which it will slip and thereby protect from excessive torque the control and any part associated with the actuating thereof, such as a flexible shaft which might otherwise be damaged by such excessive torque.

Another object is to provide an insulated friction coupling between the driving and the driven means of an electrical control for radio receivers, thus making the so-called "insacup" now commonly used only as an insulating coupling to serve the added function of an adjustable friction coupling.

Figure 1 is a fragmentary view partly in side elevation and partly in central vertical longitudinal section illustrating one embodiment of the invention;

Figure 2 is a view in side elevation showing a volume control equipped with a slotted driven shaft in accordance with the present invention;

Figure 3 is a view in end elevation looking toward the right hand end of Figure 2;

Figure 4 is a detail view in central vertical longitudinal section showing a slight modification in the construction of the coupling member employed between the flexible drive shaft and the slotted driven shaft;

Figure 5 is a view in end elevation looking toward the right hand end of Figure 4;

Figure 6 is a view in side elevation illustrating a modified form of coupling member which may be employed between the flexible drive shaft and the slotted driven shaft;

Figure 7 is a view in end elevation looking toward the left hand end of Figure 6;

Figure 8 is a view in side elevation showing the driving member employed between the flexible shaft and the coupling member in the form of the invention illustrated in Figure 1; and Figure 9 is a view in end elevation looking toward the left hand end of Figure 8.

Referring to the drawing and in particular to Figures 1 to 3, 8 and 9, the numerals 10 and 11 designate angle bracket members which are adapted to have their base portions secured by suitable fastening devices to an appropriate support. The base portions of the angle bracket members may be integral or they may be separate if desired. The variable resistance or volume control is designated generally at 12 and its housing is provided with an externally threaded mounting bushing 13, the bushing being fastened to and projecting beyond the housing. In the assembly the bushing 13 is extended through an opening 14 provided in the vertical portion of the angle bracket 10 and it is secured in position by means of a lock nut 15. A drive shaft 16 is rotatably mounted in the bushing 13 and at its inner end has driving connection with the driven parts (not shown) of the device 12 in the usual manner. The shaft 16 projects for a substantial distance beyond the bushing and its outer portion is provided with a centrally disposed, longitudinally extending slot 17 which extends out through the outer end of the shaft to form a spring fork. The shaft 16 is made up of resilient metal and the prongs or portions 18 and 19 thereof located on the opposite sides of the slot 17 are intensioned away from one another to a predetermined extent. With such a construction the prongs 18 and 19 may be sprung or pressed toward each other against their inherent resiliency and the amount of elastic resistance which they present to such action is proportional to the initial setting or intensioning thereof and the length of the slot 17.

The resilient prongs 18 and 19 of the shaft 16 are tightly and frictionally interfitted in the assembly with the socket 20 of a coupling member designated generally at 21. The insertion of the slotted end of the shaft in the socket of the coupling member may be facilitated by the provision of slight chamfers 18' and 19' on the outer edges of the prongs 18 and 19 of the slotted end of the shaft. Preferably the coupling member 21 consists of a cylinder of electrical insulating material which may be moulded from insulating resin composed principally of a phenolic condensation product, the so-called "Bakelite" for example.

As previously indicated, the prongs 18 and 19 of the shaft 16, separated by the slot 17, are initially intensioned apart, and when inserted into the socket 20 make a tight fit therein. This results in a frictional engagement of the end of shaft 16 with the socket 20 of such a nature that the amount of frictional torque required before the shaft will slip in the socket 20 is determined by the initial intensioning apart of the prongs at the slotted end of the shaft. If the frictional torque resisting slipping of the shaft 16 in the socket 20 is not sufficient, it can readily be increased by removing the shaft from the socket and spreading the prongs 18 and 19 somewhat farther apart by insertion of a screw driver in the slot between them. On the other hand, if the torque is somewhat too great, the prongs of the slotted end of the shaft may be pressed together by means of pliers, thus reducing the frictional engagement of the end of the shaft 16 with the socket 20. According to the demands of the trade, a rather accurate adjustment of the limiting torque transmitted to the cable seems essential, and the herein described means of adjusting this torque are of the utmost simplicity and effectiveness.

The coupling member 21 is positively interconnected with one end of the flexible drive shaft 22, the opposite end of which is positively interconnected with an operating knob 23 which may be provided with an indicator (not shown). The flexible shaft 22 may be positively interconnected with the coupling member 21 in various ways. As illustrated in Figures 1, 8 and 9 this may be accomplished by means of a driving member or stem 25 having annular end flanges 26. One end of the stem 25 is suitably and fixedly attached to the adjacent end of the flexible drive shaft 22. The other end of the stem 25 has an integral flat blade 27 projecting therebeyond and snugly fitted in a slot 28 provided in the adjacent end of the coupling member 21. A tapered opening or funnel 29 leads from one end of the coupling member to the entrance to the slot 28 to facilitate insertion of the flat blade 27. The blade 27 and its slot 28 are of rectangular or non-circular cross section so that when they are interfitted the driving member 25 positively transmits the motion from the flexible shaft 22 to the coupling member 21. The flanges 26 take up the end thrust and prevent the blade 27 from being disengaged from the slot 28.

The flexible shaft 22 is provided with a sheath or housing 30 extending between the knob 23 and the driving member 25. A connecting sleeve 31 with outwardly flared ends interconnects one end of this sheath 30 with a shouldered bushing 32 projecting from an opening in the angle bracket 11 and held in position by a nut 33. A flanged and knurled nut 34 secures one end of the sleeve 31 to the bushing 32.

As shown in Figure 1, when the slotted end of the shaft 16 is inserted in the socket 20 and the blade-like projection 27 of the driving member 25 is fitted in the slot 28, then the flexible shaft 22 is connected in driving relation with the shaft 16 and yet the shaft 16 is electrically insulated from the flexible driving shaft and parts associated therewith by virtue of the insulating character of the coupling member 21. The flexible shaft 22 is positively interconnected with the coupling member but the resilient forked end of the shaft 16 being in tight frictional engagement with the socket 20 will serve as a torque limiting device wherein when the torque exceeds a certain amount the shaft 16 will slip in the socket 20. The coupling will serve the double function of a torque limiting device and insulating coupling between the shaft 16 and the flexible drive shaft 22.

As illustrated in Figures 4 and 5 the socket in the coupling member 21 which receives the forked end of the drive shaft may be provided with a metal bushing 35 if desired.

Figures 6 and 7 illustrate a modified form of coupling member designated generally at 40. The coupling member 40 is provided with a socket 41 designed to be frictionally interfitted with the slotted and forked end of the driven shaft 16 but has a reduced and flanged extension 42 adapted to be directly connected to the flexible shaft thereby eliminating the driving member 25. It will be understood that the flexible driving shaft is fixedly connected to the internal opening in the reduced extension 42 while the sheath thereof is crimped about its flange to support the coupling member for rotation, the sheath itself being suitably supported in a fixed support or bracket.

It is, of course, to be understood that the driving means for the torque limiting coupling herein described may be other than a flexible shaft.

For instance, a small motor may be used to drive the radio control by remote control means. In this case, the torque limiting coupling prevents an excessive torque from being applied by the motor to the elements of the control device, and thus prevents damage of them. With the increasing application of remote control or so-called "arm chair tuning" to radio receivers, the application of the device herein described to the adjustment of the controls of a radio receiver, other than those described above, will be apparent to those skilled in the art and, therefore, this invention is not to be construed as restricted to the control of variable resistances for tone control or volume control as herein described.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A frictional torque limiting and adjustable torque transmitting means comprising a coupling between driving and driven shafts, one end of said coupling having a substantially cylindric socket, one end of one of said shafts being longitudinally slotted with its radially resilient portions intensioned away from each other whereby insertion of said slotted end of said shaft into said socket will cause a spring pressure of the slotted end of said shaft against the interior surface of said socket and thus exert a frictional hold of said shaft in said socket.

2. An adjustable frictional torque transmitting device comprising a substantially cylindric socket, a shaft adapted to fit into said socket, the end of said shaft being longitudinally slotted with its radially resilient portions intensioned outwardly to a readily adjustable extent whereby insertion of said slotted end of said shaft into said socket will cause the latter to exert a predetermined pressure against the cylindric wall of said socket and the frictional torque between said shaft and said socket may be adjusted to any value at which it is desired to have said shaft slip in said socket.

3. A frictional torque transmitting device comprising a coupling of electrical insulating material, a substantially cylindric socket in one end of said coupling, a shaft adapted to fit into said socket, the end of said shaft being longitudinally slotted with its radially resilient portions intensioned outwardly from the axis of said shaft whereby insertion of said slotted end of said shaft into said socket will give it a frictional torque limiting hold therein and whereby said coupling also electrically insulates said shaft from its driving means.

4. A frictional torque limiting and adjustable torque transmitting means comprising a driving shaft, a driven shaft, a coupling member having one end positively interconnected with one of said shafts and having a socket at its other end, the adjacent end of the other of said shafts being resilient and having a longitudinal slot, the portions of said last mentioned shaft on the opposite side of said slot being intensioned away from the other, the outer peripheral surface of said intensioned portions being frictionally interfitted with the walls of said socket with a pressure corresponding to the degree of intension impressed upon said portions.

5. A frictional torque limiting and adjustable torque transmitting means comprising a drive shaft, a driven shaft, a cylindric coupling member of electrical insulating material positively interconnected with the driving shaft and having a socket in which the driven shaft is frictionally interfitted, the portion of the driven shaft frictionally interfitted in the socket being slotted to provide a spring fork, the prongs being intensioned away from each other to predetermine the frictional engagement between the spring fork and the socket.

6. A frictional torque limiting and adjustable torque transmitting means comprising a drive shaft, a driven shaft, a cylindric coupling member of electrical insulating material positively interconnected with the drive shaft and having a socket provided with a metal bushing, said driven shaft having a spring fork whose prongs are intensioned away from each other to a predetermined extent, the spring fork being frictionally engaged with the bushing of the coupling member.

7. A frictional torque limiting and adjustable torque transmitting means comprising a drive shaft, a driven shaft, a cylindric coupling member of electrical insulating material having one end provided with a tapered opening and with a slot of non-circular cross section at the inner end of said opening, a driving stem secured to the drive shaft and having a blade-like projection of non-circular cross section tightly interfitted in the slot of said coupling member, said coupling member having a socket at the end thereof opposite the opened end slot, said driven shaft having one end slotted to provide a spring fork whose prongs are intensioned away from each other at a predetermined degree, said spring fork being tightly and frictionally interfitted in the socket of said coupling member.

8. A frictional torque limiting and adjustable torque transmitting means comprising a drive shaft, a driven shaft, a coupling member having one end positively interconnected with one of said shafts, the other of said shafts having a spring fork whose prongs are intensioned away from each other to a predetermined extent, said coupling member having a socket in which said spring fork of said shaft is tightly and frictionally interfitted.

ERWIN R. STOEKLE.